April 14, 1970 D. A. CARLSON 3,506,777

APPARATUS FOR REPRODUCING COLOR TELEVISION SIGNALS WHEREIN A PILOT SIGNAL IS UTILIZED FOR ELIMINATING HUE ERRORS DUE TO TIME BASE VARIATIONS

Filed Aug. 11, 1967 2 Sheets-Sheet 1

INVENTOR
Donald A. Carlson
BY Anderson, Luedeka, Fitch, Even & Tabin ATTORNEYS

April 14, 1970 D. A. CARLSON 3,506,777

APPARATUS FOR REPRODUCING COLOR TELEVISION SIGNALS WHEREIN A PILOT SIGNAL IS UTILIZED FOR ELIMINATING HUE ERRORS DUE TO TIME BASE VARIATIONS

Filed Aug. 11, 1967 2 Sheets-Sheet 2

INVENTOR
Donald A. Carlson

Anderson, Luedeka, Fitch, Even, & Tabin
ATTORNEYS

United States Patent Office 3,506,777

Patented Apr. 14, 1970

3,506,777

APPARATUS FOR REPRODUCING COLOR TELEVISION SIGNALS WHEREIN A PILOT SIGNAL IS UTILIZED FOR ELIMINATING HUE ERRORS DUE TO TIME BASE VARIATIONS

Donald A. Carlson, Des Plaines, Ill., assignor to Ampex Corporation, Redwood City, Calif., a corporation of California Filed Aug. 11, 1967, Ser. No. 660,042
Int. Cl. H04n 9/02, 5/78
U.S. Cl. 178—5.4 4 Claims

ABSTRACT OF THE DISCLOSURE

The invention concerns an apparatus for recording and reproducing color video signals which apparatus includes means for generating a pilot signal which is a fraction of the color burst signal. The pilot signal is added to a frequency modulated signal formed by a carrier being modulated by the composite video signal and the two signals are then recorded upon a magnetic tape. During reproduction, the derived tape signal is split into its component parts. The chrominance portion of the signal is mixed with a signal which is derived from the pilot signal multiplied to the frequency of the color burst signal. The mixing process cancels out the undesirable hue errors caused by the inherent time base error of the recording apparatus. The chrominance signal is then recombined with the luminance signal to reform the composite color video signal.

Figure 1:
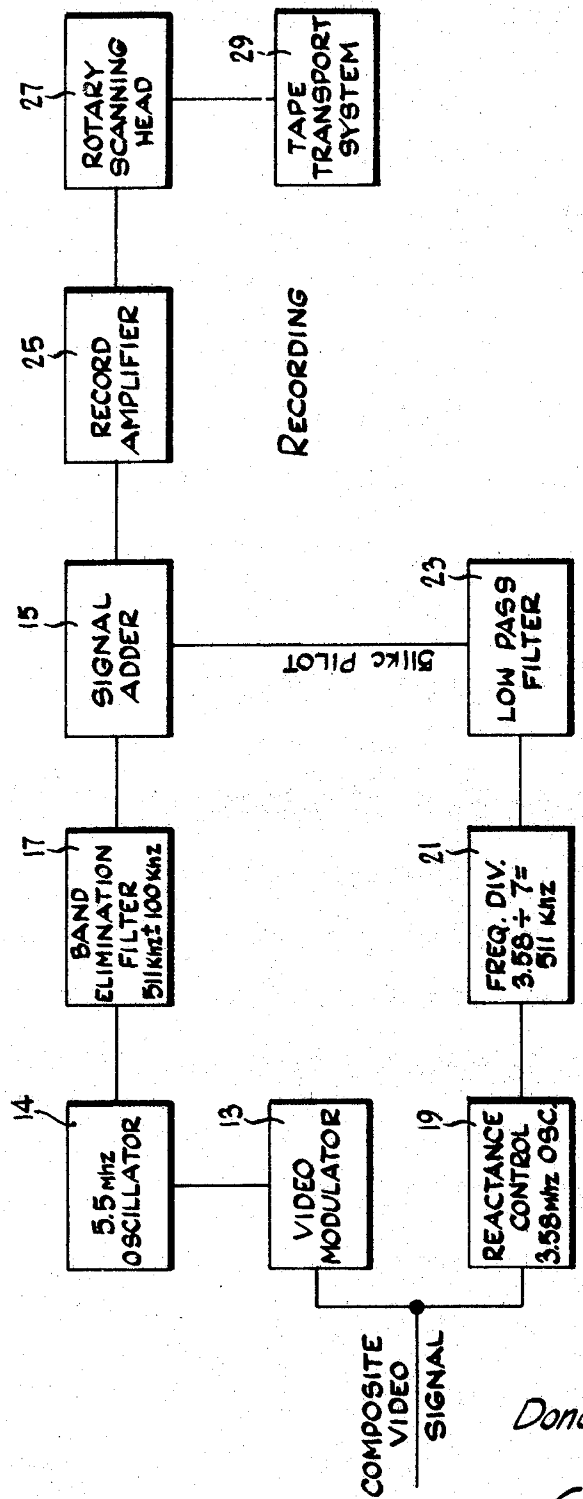

This invention relates generally to an apparatus for recording composite color television signals and relates more particularly to such an apparatus wherein means are included for substantially reducing hue errors in the chrominance signal introduced by variation in speed of the recording transducer with respect to the recording medium.

In accordance with the NTSC color system, which is in standard use throughout the United States, a composite color video signal contains a signal representing the picture luminance information (generally designated Y) and a chrominance signal which is a color subcarrier of 3.58 megahertz modulated in phase corresponding to hue and in amplitude corresponding to saturation. The amplitude and phase modulated color subcarrier is formed by amplitude modulating a 3.58 megahertz carrier in phase-quadrature with two signals representing color information (designated I and Q) and then suppressing the carrier. In addition, the composite color signal includes horizontal and vertical synchronization signals and a 3.58 megahertz color burst at the start of each horizontal scan. This color burst signal is utilized to control a demodulation oscillator at the receiver or other decoder, which is utilized to recover the color I and Q) information. The color hues reproduced at the receiver are dependent upon the phase of the color subcarrier as compared with the burst signal. An error in relative phase between the burst signal and the color subcarrier produces a perceptible shift in hue of the reproduced color picture.

In conventional color video recorders a carrier signal is frequency modulated by the composite color video signal and the frequency modulated signal is recorded on the recording medium. During reproduction, the frequency modulated signal is reproduced, limited and then demodulated to produce the original composite color video signal. Variations in relative speed between the transducer head and the tape and variations in tape dimension cause phase errors in the reproduced chrominance signal (commonly called time-base errors). Such time-base errors take the form of low frequency (wow) and high frequency (flutter) variations. With present recording techniques, it is quite difficult and expensive to reduce the high frequency variations to a sufficient extent to provide a stable color picture.

Various methods have heretofore been devised to reduce the effects of such time-base errors. A particular system is described in the United States Patent No. 3,095,742 issued to R. M. Dolly et al. With respect to the apparatus described therein, a pilot signal, which is derived from the color burst signal, is recorded upon the recording medium simultaneously with a signal which has been frequency modulated with the composite video signal. During reproduction from the tape medium, the pilot signal is separated from the reproduced signal and utilized to derive a 3.58 megahertz signal. The reproduced signal is detected to provide the composite video signal which together with the 3.58 megahertz signal is fed into a chrominance demodulator to thereby provide the individual I and Q signals. In the event the signal is to be re-transmitted or fed into the antenna terminals of a conventional television receiver, the I and Q signals must be modulated onto a subcarrier and combined with the illuminance or Y signal. The necessity for recombining the I and Q signals for re-transmission or conventional receiver viewing is particularly undesirable in that additional circuitry is required to perform this operation.

The patent to Leyton, No. 2,979,558, discloses a system which eliminates the necessity of demodulating the I and Q signals. The Leyton system utilizes a "start-stop" oscillator in the reproduction apparatus which is locked to the reproduced 3.58 megahertz color burst signal. The oscillator output is modulated with a local stable signal source and the upper side band selected (first sum frequency signal). The reproduced chrominance signal is modulated with a higher multiple of the local signal source and the upper side band is selected (second sum frequency signal). The first sum frequency is then modulated with the second sum frequency and the difference frequency is selected. This difference frequency, which is the corrected chrominance signal, is then recombined with the luminance signal. Since the burst locked oscillator is locked to the periodic burst pulses at the beginning of each horizontal line, the Leyton system does not compensate for changes in the time base of the recorder during a horizontal line (between burst signals). In lower price recorders, such changes can be substantial.

In a second embodiment in the Leyton patent, two pilot signals are added to the color video signal and the combined signal is converted to a frequency modulated signal for recording. During reproduction the two pilot signals are separated from the demodulated signal and are mixed together to provide a signal which is substituted for the signal of the burst locked oscillator of Leyton's first embodiment. The use of two pilot signals and the combining of the pilot signals with the video signal has resulted in expensive and complicated circuitry and has also produced noise and distortion in the reproduced video signal.

A main object of this invention is to provide an improved apparatus for recording composite color video signals upon a magnetic medium and for reproduction therefrom. A still further object is to provide an apparatus for recording composite color video signals upon a magnetic medium and reproduction therefrom which has means therein for reducing undesirable effects of time base errors upon the reproduced chrominance signal.

Figure 2:
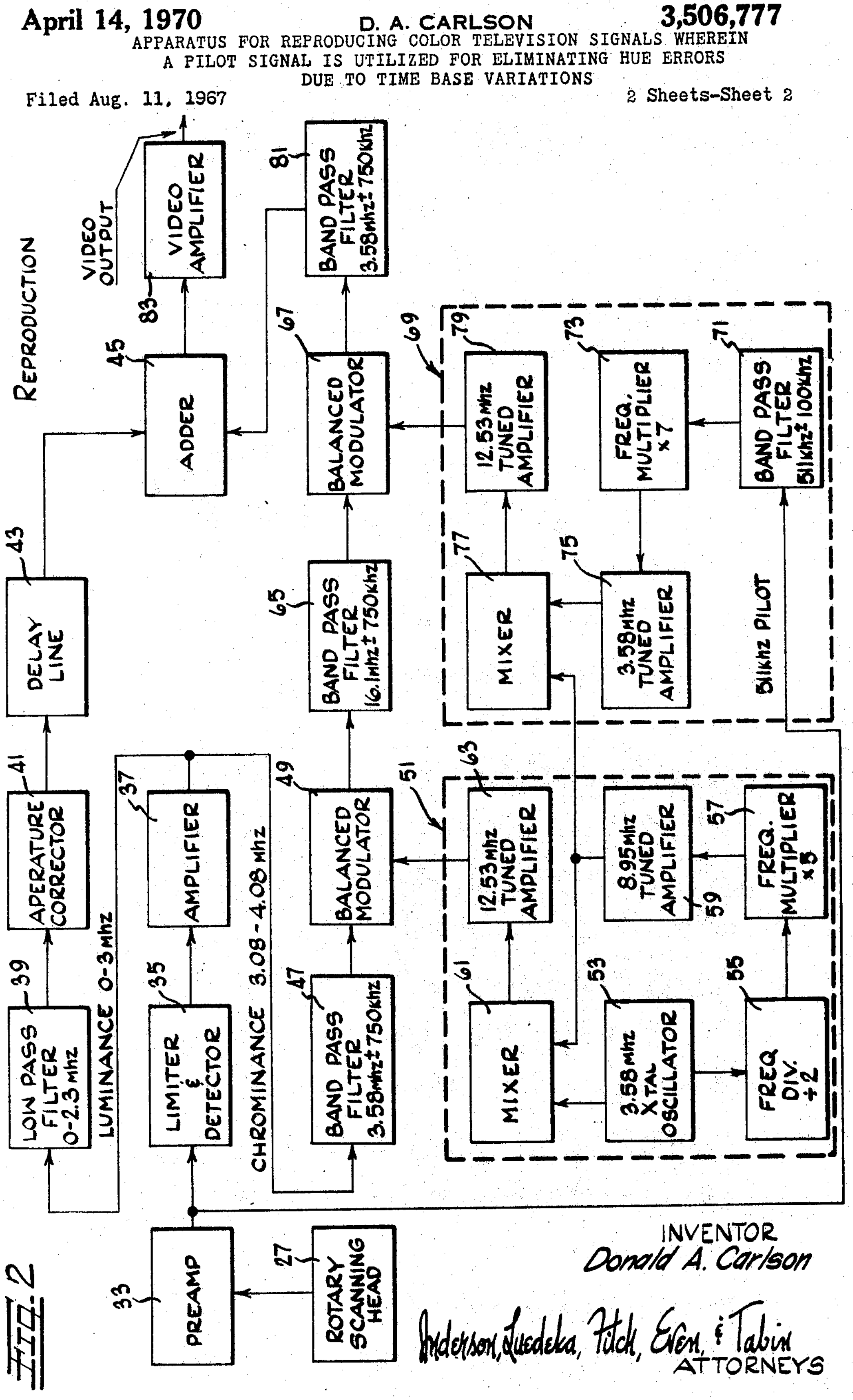

Other objects and advantages of the present invention will become apparent through reference to the following description and accompanying drawings which show an illustrative embodiment of this invention in which:

FIGURE 1 is a block diagram of a video recording apparatus embodying certain features of this invention; and FIGURE 2 is a block diagram of a video reproducing apparatus embodying certain features of this invention.

Briefly, in accordance with the invention, an apparatus is provided for recording a composite color video signal on a storage medium and for reproducing the same. In the apparatus, means is provided for generating a continuous pilot signal which is a fraction of the frequency of the color burst signal. The pilot signal is combined with a frequency modulated signal formed by frequency modulating a carrier with the color video signal and the combined signal is recorded on a single track on the storage medium. During reproduction, the pilot signal is separated from the reproduced frequency modulated signal, is multiplied to a frequency equal to that of the color burst signal, and is then modulated with a local reference signal. The frequency modulated signal is demodulated, the chrominance information is separated from the remainder of the video signal and then the separated chrominance information is modulated with a higher frequency local reference signal. The upper side band of one modulation process is then modulated with the upper side band of the other modulation process and the resulting lower side band, which is the corrected chrominance signal, is added to the video signal.

More particularly, in the recording system illustrated in FIGURE 1, the composite color video signal is converted to a frequency modulated signal for recording in the conventional manner. In this connection, the recording system includes a video modulator 13, the input of which receives the composite color television signal from a signal source (not shown). The output of the video modulator 13 is used to frequency modulate an oscillator 14 which, in the illustrated embodiment, provides a carrier signal at 5.5 megahertz. A pilot signal is added to the frequency modulated signal in a signal added 15 coupled to the output of the oscillator 14. To prevent interference between the frequency modulated signal and the pilot signal, a band of frequencies having the pilot frequency at its center is eliminated from the frequency modulated signal by a band elimination filter 17 disposed between the oscillator 14 and one input of a signal adder 15. The band elimination filter 17 serves to reject a narrow band of frequencies which is so positioned that the quality of the televised picture is not substantially reduced and the pilot is within the recordable band pass of the recorder. Preferably, the pilot signal is a fraction of the frequency of the color burst signal and is at a frequency below the lower side band component of the frequency modulated signal produced by the maximum frequency of the video signal. In the illustrated embodiment, the band extends from approximately 411 to 611 kilohertz, and the pilot frequency is 511 kilohertz.

The pilot signal is provided by coupling the composite video signal to a reactance controlled oscillator 19 which is locked to the frequency of the color burst signal. The output from the oscillator 19 is passed through a frequency divider 21 which divides the nominal output of the burst oscillator by seven, thereby providing the 511 kilohertz continuous pilot signal. The output of the frequency divider 21 is passed through a low pass filter 23 and into a second input of the signal adder 15. The low pass filter 23 serves to reduce any high frequency components which may be present in the output signal of the frequency divider so as to pass a substantially clean pilot signal to the signal adder 15.

The output of the signal adder 15 is supplied to the input of a record amplifier 25 and therefrom to a rotary recorder head 27 of a video tape recorder for application to a video tape carried by a tape transport system 29. The recorder preferably is a single head helical scan recorder, such as the VR 7500 manufactured by Ampex Corporation.

The reproduction apparatus is shown in FIGURE 2 and includes the rotary scanning head 27 which reproduces the recorded signal from the tape and feeds it to a preamplifier 33 for amplification. The output of the preamplifier 33 is introduced into a limiter and detector unit 35 which demodulates the composite signal. The demodulated signal is then fed into an amplifier 37 the output of which is separated into two branches. The luminance signal is taken from the output of the amplifier 37 by means of a luminance filter which is in the form of a low pass filter 39. The filter 39 is preferably constructed to provide a band pass from zero to 2.3 megahertz. The output of the filter is then fed into an aperture-corrector 41 the function of which is to accommodate for the loss of sharpness and detail which takes place during the recording process. The output of the aperture corrector 41 is fed to a delay line 43 the delay characteristics of which are selected so that the path of the luminance signal branch is approximately equal to the path of the chrominance signal which will hereinafter be described. The luminance output of the delay line is fed into one input of a signal adder 45.

The chrominance signal is separated from the luminance signal by coupling the output of the amplifier 37 to a chrominance filter which, in the illustrated embodiment, is in the form of a band pass filter 47 having a center frequency of 3.58 megahertz and half power points at 750 kilohertz on either side thereof. The chrominance signal is increased in frequency without changing the absolute value of the frequency variations, by coupling the output of the band pass filter 47 to one input of a mixer 49 preferably in the form of a balanced modulator so that the upper side band of the output can be easily selected (i.e., the input signal closer in frequency to the upper side band is not present in the output).

The other input signal to the balanced modulator 49 is a stable reference signal provided by a frequency generating means 51. The frequency generating means 51 includes a stable 3.58 megahertz crystal oscillator 53 the output of which is fed into a frequency splitter or divider 55. The 1.79 megahertz output of the divider is quintupled by a frequency multipler 57. The 8.95 megahertz output of the frequency multiplier 57 is amplified by a tuned amplifier 59. The outputs of the crystal oscillator 53 and the tuned amplifier 59 are mixed in a mixer 61, the output of which is fed into a 12.53 megahertz tuned amplifier 63. It should be noted that the output of the amplifier is relatively stable since it is synthesized from a single crystal. The output of the amplifier 63 is introduced into the other input of the balanced modulator 49, the other input of which, as previously mentioned, receives the chrominance signal from the filter 47.

The upper side band or sum frequency signal of the output of the balanced modulator 49 is selected by a band pass filter 65 having a center frequency of 16.1 megahertz and half power points 750 kilohertz on either side thereof. Since the 3.58 megahertz chrominance signal, which exhibits frequency variations resulting from the inherent time base error of the tape recording system, is mixed with a stable, crystal synthesized signal, the sum frequency signal of the balanced modulator exhibits the same absolute value of frequency variations as did the original chrominance signal.

The output of the band pass filter 65 is fed into the input of a second mixer 67 preferably a balanced modulator so that the lower side band may be easily selected. The alternate input of the second balanced modulator is connected to the output of a pilot frequency processing means 69.

As previously mentioned, there is inherent in the transport system and the tape medium time base errors which produce phase shifts in the phase of the reproduced chrominance signal. On a percentage basis, both the pilot signal and the chrominance signal recorded upon the tape storage medium experience the same frequency fluctuations. In other words, a rise in the chrominance signal frequency caused by a change in relative head-tape speed produces a corresponding percentage rise in the frequency of the pilot signal. Multiplication of the pilot signal to the frequency level of the suppressed chrominance carrier results in the pilot having the same frequency fluctuation as the chrominance signal.

The pilot signal is increased in frequency to that of the color burst signal by a processing means 69 which includes a pilot filter in the form of a band pass filter 71 having a center frequency of 511 kilohertz and half power points at 100 kilohertz on either side thereof. The pilot signal from the preamplifier 33 passes through the filter 71 and to a septupler 73. The multiplier 73 raises the pilot frequency to generally 3.58 megahertz which signal is thereafter fed into a 3.58 megahertz tuned amplifier 75. It should be noted that the frequency variations introduced into the pilot signal by the transport system time base error are multiplied as is the nominal value of the pilot frequency. Thus, the frequency excursions of the 3.58 megahertz output of the tuned amplifier 75 are the same as the time base error deviations in the chrominance signal. The output of the tuned amplifier 75 is increased in frequency, without increasing the absolute value of the frequency variation, by coupling the same to one output of a mixer 77. The remaining input of the mixer 77 receives an 8.95 megahertz signal from the tuned amplifier 59 and the output thereof is fed into a tuned amplifier 79 tuned to a frequency of 12.53 megahertz.

As previously explained, the raised chrominance signal frequency and the output of the tuned amplifier 79 are mixed in the second balanced modulator 67. The two signals are mixed and the difference frequency is selected by a band pass filter 81 having a center frequency of 3.58 megahertz and half power points to 750 kilohertz on either side thereof. The raised chrominance signal at the output of the filter 65 and the raised pilot signal display in absolute terms equal variations in frequency caused by the time base error of the recording system. The two signals shift in frequency by equal amounts and in the same direction, and thus, the difference between them is constant and therefore free of time base error variations. This particular feature of the illustrated embodiment results in elimination of hue shifts in the chrominance signal.

The output of the band pass filter 81 is coupled to the signal adder 45 whereat the luminance signal and chrominance signal are combined. The output of the adder 45 is fed to a video amplifier 83, the output of which may be used for modulation of a transmitter, direct introduction in the intermediate frequency amplifiers of a conventional television receiver, etc.

As can be seen from the above, an apparatus for recording and reproducing composite television signals is described which includes means for minimizing the signal distortion introduced by the time base error of the tape transport system. Although but one specific embodiment of this invention has been herein shown and described, it will be understood that details of the construction shown may be altered without departing from the spirit of this invention as defined by the following claims.

What is claimed is:

1. An apparatus for recording on and reproducing from a storage medium a composite color television signal which is converted into a frequency modulated signal for recording, the apparatus having an inherent time base error, comprising means for generating a single continuous pilot signal of a predetermined frequency other than that of the color burst signal, a recording transducer means receiving the frequency modulated signal and receiving said pilot signal for simultaneously recording both of the signals on the same track on said storage medium, a reproducing transducer means for reproducing the recorded pilot signal and the composite signal from the tape storage medium, a limiter coupled to the reproducing transducer, a demodulator coupled to the output of the limiter, a first mixer, a chrominance filter means receiving the output of said demodulator for passing only the chrominance portion of said reproduced composite signal, the output of said chrominance filter being connected to a first input of said first mixer, a first stable reference signal source coupled to the other input of said first mixer, a first filter means coupled to the first mixer for passing only the sum frequency component of the output of the first mixer, a second mixer having one input connected to the output of said first filter, means receiving said reproduced pilot signal and converting the same to a frequency equal to that of the color burst signal, a third mixer having one input coupled to the output of said converting means, a second stable reference signal source coupled to the other input of said third mixer, a second filter means coupled to the output of said third mixer for selecting the sum frequency component of the output of said third mixer, the output of said second filter means being coupled to the other input of said second mixer, a third filter means coupled to the output of said second mixer for selecting the difference frequency component of the output of said second mixer, the frequencies of said reference signal sources being selected so that the output of said third filter means has the frequency of the recorded chrominance carrier, luminance filter connected to the output of said demodulator and passing therethrough the luminance portion of said signal, and a signal adder having a first input receiving said luminance portion from said luminance filter and a second input receiving the chrominance signal from the output of said third filter means so that a composite color television signal is produced at the output of said adder, the chrominance portion of which is substantially free of variations caused by the time-base variations.

2. An apparatus in accordance with claim 1 wherein the pilot signal is at a frequency equal to a fraction of that of the color burst signal and is below the first order lower side band component of the frequency modulated signal produced by the maximum frequency of the video signal, and which further includes a pilot signal filter coupled to said reproducing transducer, and a frequency multiplier connected between said pilot signal filter and said third mixer for multiplying the frequency of said pilot signal to that of the color burst signal.

3. Apparatus in accordance with claim 2 wherein said first and second mixers are balanced modulators.

4. Apparatus in accordance with claim 3 wherein the pilot signal is at a frequency of 511 kilohertz, the first stable reference source is at a frequency of 12.53 megahertz and the second reference source is at a frequency of 8.95 megahertz.

References Cited

UNITED STATES PATENTS

| | | |
|---|---|---|
| Re. 26,412 | 6/1968 | Dolby et al. |
| 3,304,377 | 2/1967 | Kietz et al. |

ROBERT L. GRIFFIN, Primary Examiner

D. E. STOUT, Assistant Examiner

U.S. Cl. X.R.

178—6.6